United States Patent
Karlsson

(10) Patent No.: US 7,004,989 B2
(45) Date of Patent: Feb. 28, 2006

(54) FILTER ASSEMBLY WITH COMPRESSED MEDIA EDGE SEAL

(75) Inventor: Niclas Karlsson, Sodertalje (SE)

(73) Assignee: Camfil Farr, Inc., Rancho Dominguez, CA (US)

( * ) Notice: Subject to any disclaimer, the term of this patent is extended or adjusted under 35 U.S.C. 154(b) by 194 days.

(21) Appl. No.: 10/648,729

(22) Filed: Aug. 22, 2003

(65) Prior Publication Data

US 2005/0039427 A1    Feb. 24, 2005

(51) Int. Cl.
*B01D 46/00*   (2006.01)

(52) U.S. Cl. .......................... 55/497; 55/498; 55/499; 55/500; 55/501; 55/502; 55/503; 55/511; 55/521; 55/DIG. 5; 55/DIG. 31; 95/273

(58) Field of Classification Search .......... 55/495, 55/497, 498, 496, 500, 501, 502, 503, 507, 55/511, 521, 510, DIG. 31, DIG. 5, 499; 95/273; 210/493.1, 493.3, 493.5
See application file for complete search history.

(56) References Cited

U.S. PATENT DOCUMENTS

| | | | | |
|---|---|---|---|---|
| 2,135,863 A | * | 11/1938 | Walker | 55/521 |
| 3,076,303 A | * | 2/1963 | Durgeloh | 55/DIG. 31 |
| 3,873,288 A | * | 3/1975 | Wachter et al. | 55/497 |
| 4,617,122 A | * | 10/1986 | Kruse et al. | 55/521 |
| 4,795,481 A | | 1/1989 | Ellis | 55/500 |
| 5,512,074 A | | 4/1996 | Hanni et al. | 55/484 |
| 5,620,505 A | * | 4/1997 | Koch et al. | 55/502 |
| 5,958,097 A | * | 9/1999 | Schlor et al. | 55/497 |
| 6,045,599 A | * | 4/2000 | Solberg, Jr. | 55/521 |
| 6,074,450 A | * | 6/2000 | Raber | 55/497 |
| 6,221,122 B1 | | 4/2001 | Gieseke et al. | 55/500 |
| 6,319,300 B1 | * | 11/2001 | Chen | 55/497 |
| 6,383,244 B1 | * | 5/2002 | Wake et al. | 55/502 |
| 6,568,540 B1 | * | 5/2003 | Holzmann et al. | 55/502 |
| 6,620,223 B1 | * | 9/2003 | Bloomer | 95/273 |
| 6,740,136 B1 | * | 5/2004 | Duffy | 55/497 |
| 6,808,547 B1 | * | 10/2004 | Ota et al. | 55/497 |

FOREIGN PATENT DOCUMENTS

WO    00/32295    6/2000

OTHER PUBLICATIONS

"Riga-flo®, High-Lofted Supported Media Air Filter" Brochure, Product sheet 1303-0302, ©Camfil-Farr Mar. 2002, www.camfilfarr.com.

"e-series Riga-flo®, Environmentally-Friendly Supported Media Air Filter," Brochure, Product sheet 1303-0302, ©Camfil-farr Mar. 2002, www.camfilfarr.com.

* cited by examiner

*Primary Examiner*—Jason M. Greene
(74) *Attorney, Agent, or Firm*—Keith Taboada, Esq.; Patterson & Sheridan, L.L.P.

(57) ABSTRACT

Embodiments of a filter assembly and method of fabricating the same are provided. In one embodiment, a filter assembly includes a filter media pack disposed in a frame assembly. A first seal biases the filter media pack against a second seal along at least one edge of the media pack. In another aspect, a method of fabricating a filter assembly includes the steps of placing a filter media pack in at least a first portion of a frame assembly and compressing an edge of the media pack between a first and second seal.

28 Claims, 6 Drawing Sheets

FILTER ASSEMBLY WITH COMPRESSED MEDIA EDGE SEAL

BACKGROUND OF THE INVENTION

1. Field of the Invention

Embodiments of the invention generally relate to an air filter assembly and method for fabricating the same.

2. Description of the Related Art

Air filter assemblies typically include a housing retaining a filter element, also as known as a media pack. The media pack is often pleated to increase the surface area available for air passage, thus increasing the filtration efficiency while reducing the pressure drop across the filter assembly. The media pack is typically sealed along its edges to the housing to prevent air from bypassing the media pack as it flows through the filter assembly. The type of seal utilized between the media pack and housing may vary, often depending on the filtration efficiency of the filter assembly and the amount of permissible bypass.

Pleated media packs are often difficult to seal along their pleated edges. As such, many filter designs utilize potting or adhesive compounds that flow around the pleated edges to seal the media pack to the housing. This manner of sealing the media pack to the housing generally provides a reliable seal, but requires a substantial amount of costly raw material and is time consuming to perform.

High loft material may also be used to seal the pleated edge of the media pack. Although high loft material is easy to use and relatively inexpensive, it may allow a significant amount of air to bypass the media pack, disadvantageously reducing filtration efficiency. Moreover, as the edge of the media pack must compress the high loft material, the lack of compression strength of the media pack often results in folding or cracking of the filter media when interfaced against the high loft material, thereby increasing the rate of undesirable air leakage around and/or through the media pack. Thus, it would be desirable for air filter assemblies to have a filter media seal that is economical, easy to install or apply, and allows minimal air bypass.

Therefore, there is a need for an improved filter media seal.

SUMMARY OF THE INVENTION

Embodiments of the invention generally provide a filter assembly having a compressed media edge seal and method of fabricating the same. In one embodiment, a filter assembly includes a frame assembly, a filter media pack disposed in the frame assembly, a first seal element disposed on a first side of an edge of the media pack, and a second seal element disposed on a second side of the edge of the media pack, the second seal element biasing at least a portion of the media pack against the first seal element.

In another embodiment of the invention, a method for fabricating a filter assembly includes the steps of inserting a first seal element into a portion of a frame assembly, interleaving pleats of a media pack with the first seal element, interleaving a second seal element with the pleats of the media pack, and compressing the pleats between the first and second seal elements.

DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Embodiments of the invention generally provide a filter assembly having individual seal elements disposed on opposite sides of an edge of a pack of filter media. The seal elements are configured to compress (i.e., clamp) the edge of the media pack to substantially prevent bypass along the edge of the filter assembly.

Figure 1A:
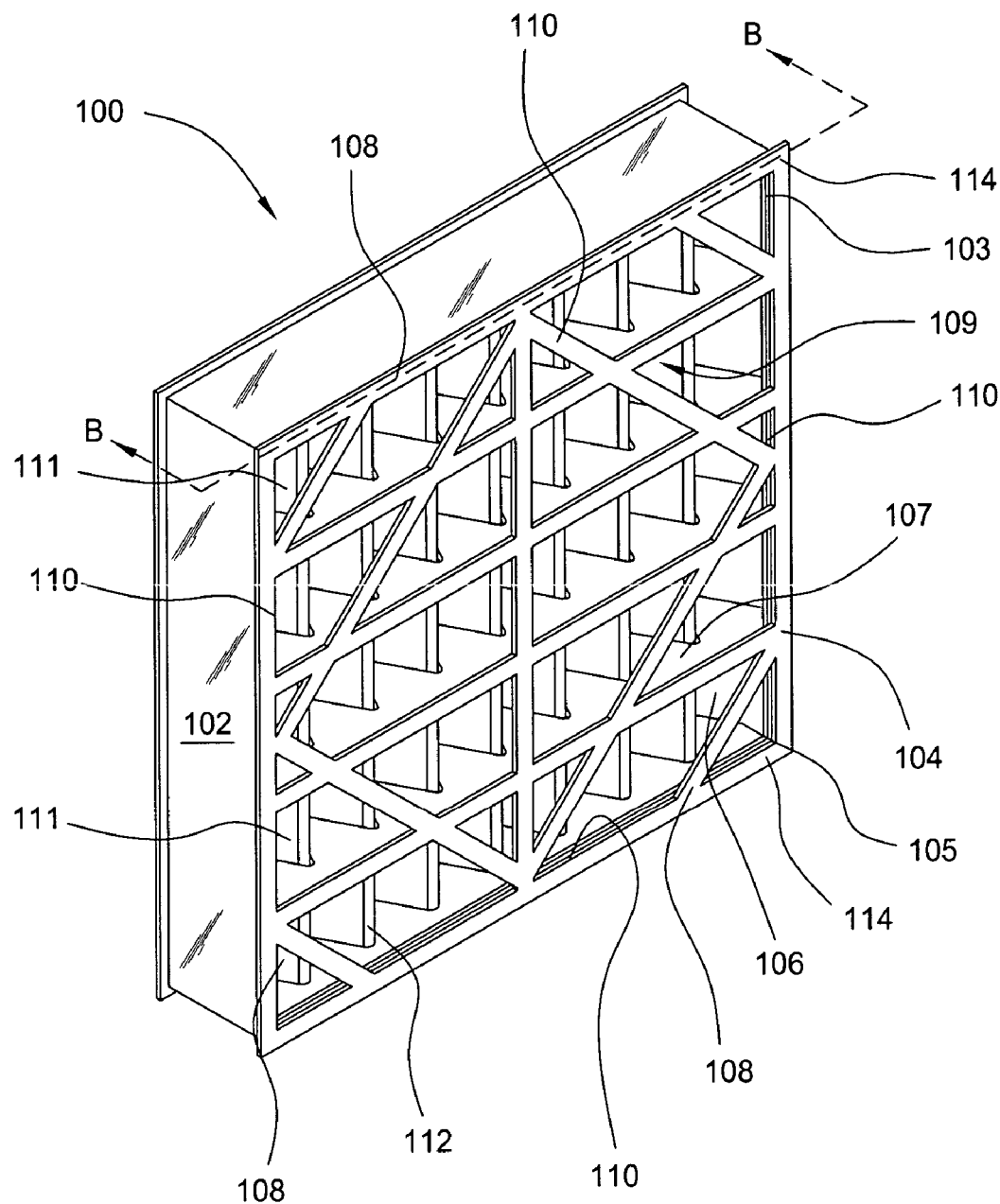
FIG. 1A is a perspective view of a filter assembly according to one embodiment of the present invention.

FIG. 1A is a perspective view of a filter assembly 100 according to one embodiment of the present invention. The filter assembly 100 comprises a frame assembly 102, an optional grille 104 (part of which is shown in phantom), filter media pack 106, separators 107 and sealing elements 108. One example of a filter that may be advantageously adapted to benefit from the invention is a RIGA-FLO® air filter, commercially available from Camfil Farr, Inc. located in Riverdale, N.J.

The frame assembly 102 is generally configured to house the filter media pack 106. The frame assembly 102 is comprised of three or more sides 110 enclosing an open passage 109. The sides 110 of the frame assembly 102 may have a C-shaped profile that accepts the edge of the filter media pack 106 and may be fabricated from aluminum, sheet metal, plastic, paper (meaning to include paper-like products), wood or other suitable material. In the embodiment depicted in FIG. 1A, the frame assembly 102 has a quadrilateral form.

Figure 1B:
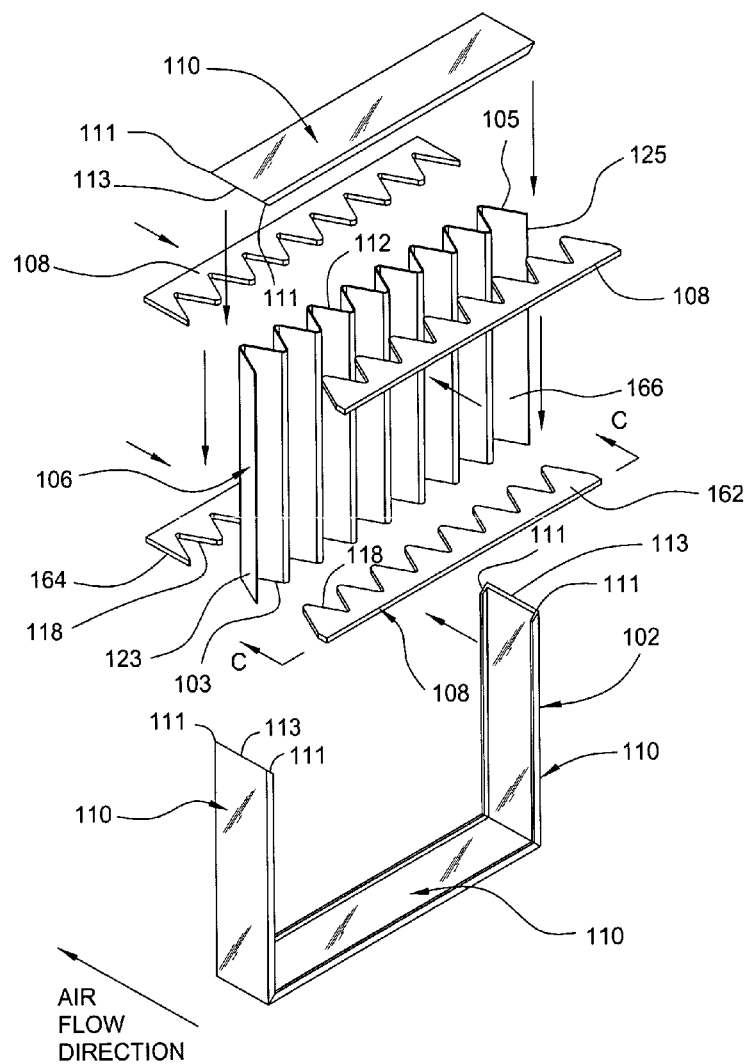
FIG. 1B is a simplified exploded view of the filter assembly of FIG. 1.

Referring additionally to the simplified exploded view of the frame assembly 102 depicted in FIG. 1B, the frame assembly 102 may be fabricated from one or more sections. For example, the sides 110 may include one or more flanges 111 extending from a main section 113. The flanges 111 are generally oriented perpendicular to the direction of air flow through the filter assembly 100 while the main section 113 is generally oriented parallel to the air flow direction. The flanges 111 may be fabricated as separate members and are coupled to the main section 113 to form the frame assembly 102. Alternatively, one or more of the sides 110 may be separate members combinable to form the frame assembly 102. In the embodiment depicted in FIG. 1B, at least one of the sides 110 is separated from the remaining frame components (e.g., sides) to allow the media pack 106 to be inserted between the flanges 111 of the partially complete frame assembly 102. Once the media pack 106 and optional grille 104 are disposed between the flanges 111 of the partially complete frame assembly 102, the remaining side 110 is joined to complete the frame assembly 102 retaining the media pack 106 and the grille 104 therein. The sides 110 of the frame assembly 102 may be joined by clips, tape, adhesives, screws, rivets or other suitable device.

The grille 104 is positioned over the open passage 109 defined by the frame assembly 102 to protect the media pack 106 from damage and is configured with a predefined percentage of open area to allow air to flow therethrough. The grille 104 is typically anchored within the frame assembly 102 by the sealing elements 108 that seal the media pack 106 to the frame assembly 102. Alternatively, the grille 104 may be an integral part of the frame assembly 102 (e.g., comprised of a singular member).

The filter media pack 106 is fabricated from filtration media folded in a zig-zag fashion to form accordion-style pleats 112. The type of filtration media and number of pleats 112 per pack 106 are selected to meet a predefined performance criteria, such as particulate filtration efficiency and pressure drop. Separators 107 (shown only in FIG. 1A) are disposed between the pleats 112 to maintain pleat spacing during flow conditions. The separators 107 may be rib or string separators adhered to the media pack 106, hot melt or adhesive beads, among other devices for maintaining pleat formation during flow conditions. The separators 107 may be continuous or intermittent. The separators 107 may alternatively be a metal or other material disposed between a selected number of pleats 112 to maintain pleat spacing.

Referring back to the media pack 106 has open ends 103, 105 along the edges of the pack parallel to the direction of the pleats 112, and closed ends 123, 125 at ends of the pack proximate the first and last pleat 112. In one embodiment, the weight of the pleats 112 are selected to fit within the flanges 111 of the sides 110 of the frame assembly 102.

At least the open ends 103, 105 are engaged with the frame assembly 102 by the sealing elements 108 to reduce and/or prevent air leakage between the pack 106 and frame assembly 102. The closed ends 123, 125 may be engaged with the frame assembly 102 by other sealing elements 108 (not shown) or by conventional sealing techniques. In some instances, such as low filtration efficient air products, no elements or devices are used for minimizing air flow between the closed ends 123, 125 and the frame assembly 102.

Figure 1C:
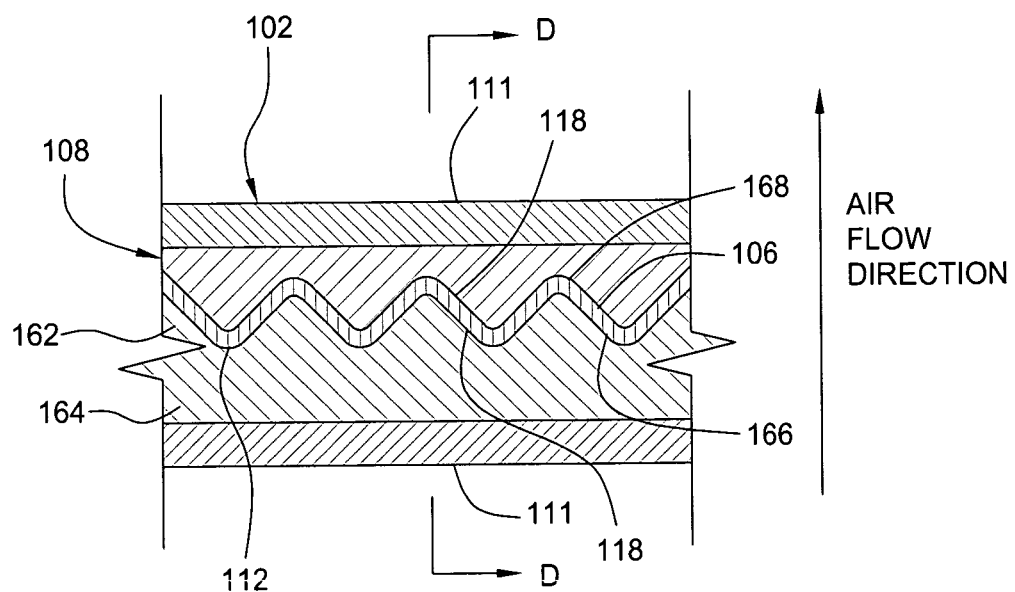
FIG. 1C is a cross-sectional view of the filter assembly taken along line C—C of FIG. 1B.

FIG. 1C is a cross-sectional view of the filter assembly 100 taken along line C—C of FIG. 1B, and illustrates the first open end 103 of the media pack 106 and one of the sealing elements 108 in greater detail. The first sealing element 108 includes a first seal member 162 disposed on a first side 166 of the media pack 106, and a second seal member 164 is disposed on a second side 168 of the media pack 106. The first and second seal members 162, 164 are configured to clamp the open end 108 of the media pack 106 to limit or prevent the passage of air around the end 103 of the media pack 106. In one embodiment, the first seal element 162 biases the open end 103 of the pack 106 against the first seal element 164 (i.e., in a direction parallel to air flow through the filter assembly 100), so that the first and second seal elements 162, 164 compress the pleated open edge 103 of the media pack 106 therebetween. At least one of the first and second seal elements 162, 164 may be biased against the frame (102 in FIG. 1A), also in a direction parallel to air flow through the filter assembly 100 to minimize air flow therebetween.

Figure 1D:
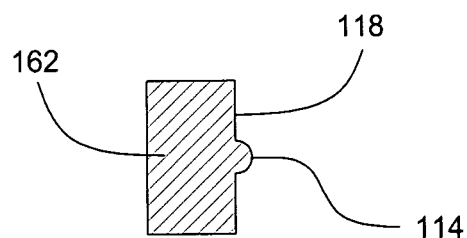
FIG. 1D is a sectional view of one embodiment of a sealing element taken along section line D—D of FIG. 1C.

Each of the seal elements 162, 164 have a serrated edge 118 that interleaves with the pleats 112 of the media pack 106. The edge 118 may optionally include at least one seal feature for enhancing the seal between the frame assembly 102 and/or media pack 106. In the embodiment illustrated in FIG. 1D, the edge 118 is a rib 114 extending from the edge 118. In another embodiment, the seal feature may be a groove formed in the edge 118.

At least one of the seal elements 162, 164 is formed from a preformed, compressible, resilient material to facilitate clamping of the pleats 112 therebetween. Examples of such materials include, but are not limited to, elastomers, plastic, a foamed plastic or elastomer or other suitable materials. In one embodiment, the seal elements 162, 164 are fabricated from foamed polyethylene (PE). The seal elements 162, 164 may be retained by the flanges 111 of the frame assembly 102, or may alternatively be adhered to the frame assembly 102 using adhesives or clips.

In one exemplary assembly technique, the filter assembly 100 may be fabricated by assembling three adjoining sides to form a C-shaped frame sub-assembly. The media pack 106 (and optional grille 104 not shown in FIG. 1B) is inserted between the opposing sides 110 of the frame sub-assembly. The remaining side 110 of the frame assembly 102 is coupled to the other sides 110 to capture the media pack 102 within the frame assembly 102.

The seal elements 162 may be disposed (e.g., installed) on either side of the open ends 103, 105 at any point during the filter's assembly. In one embodiment, at least one of the sealing elements 162, 164 is inserted between the flange 111 and media pack 106 after the pack is enclosed in the frame assembly 102.

Figure 2A:
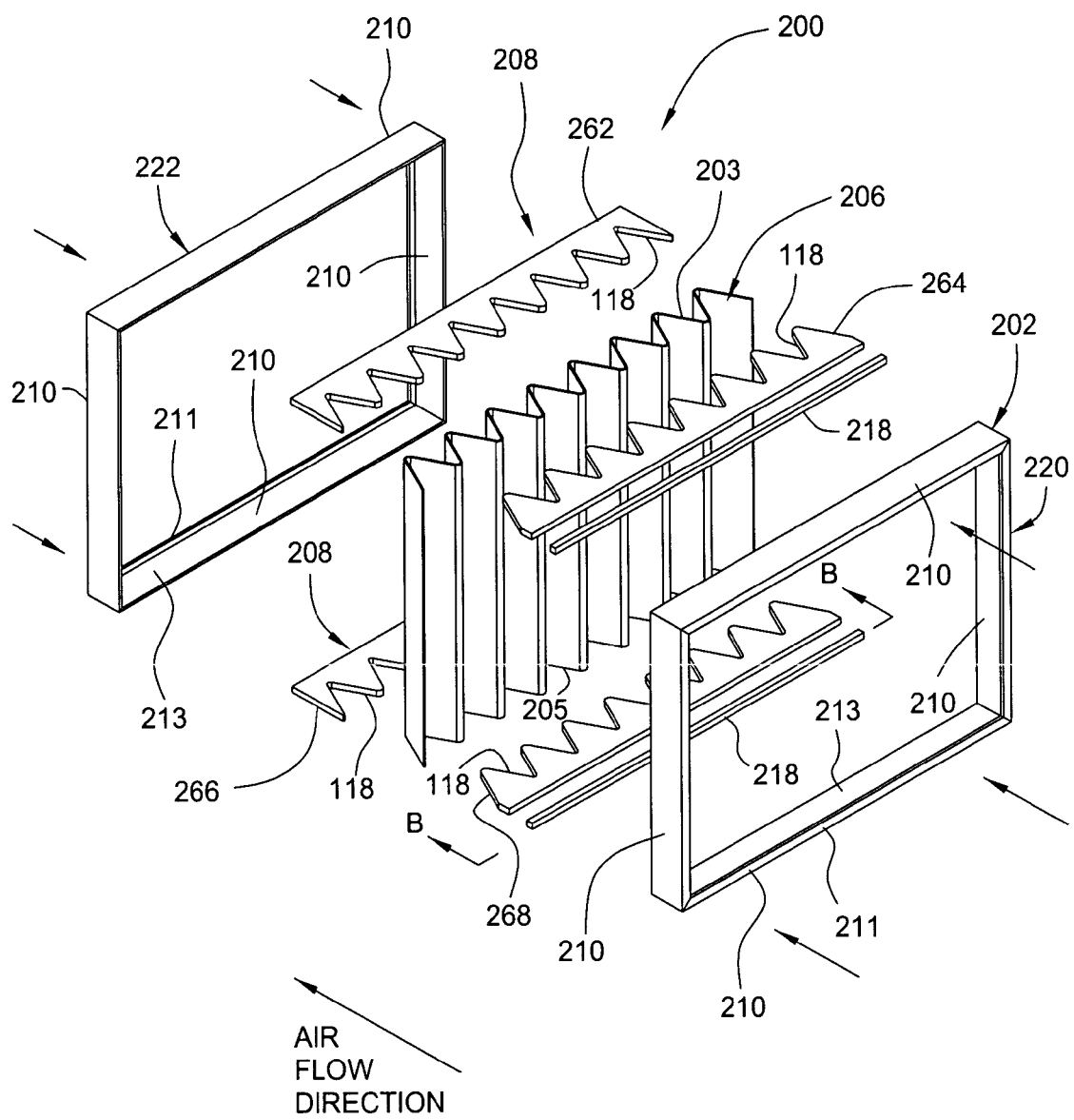
FIG. 2A is a simplified exploded view of another embodiment of a filter assembly.
Figure 2B:
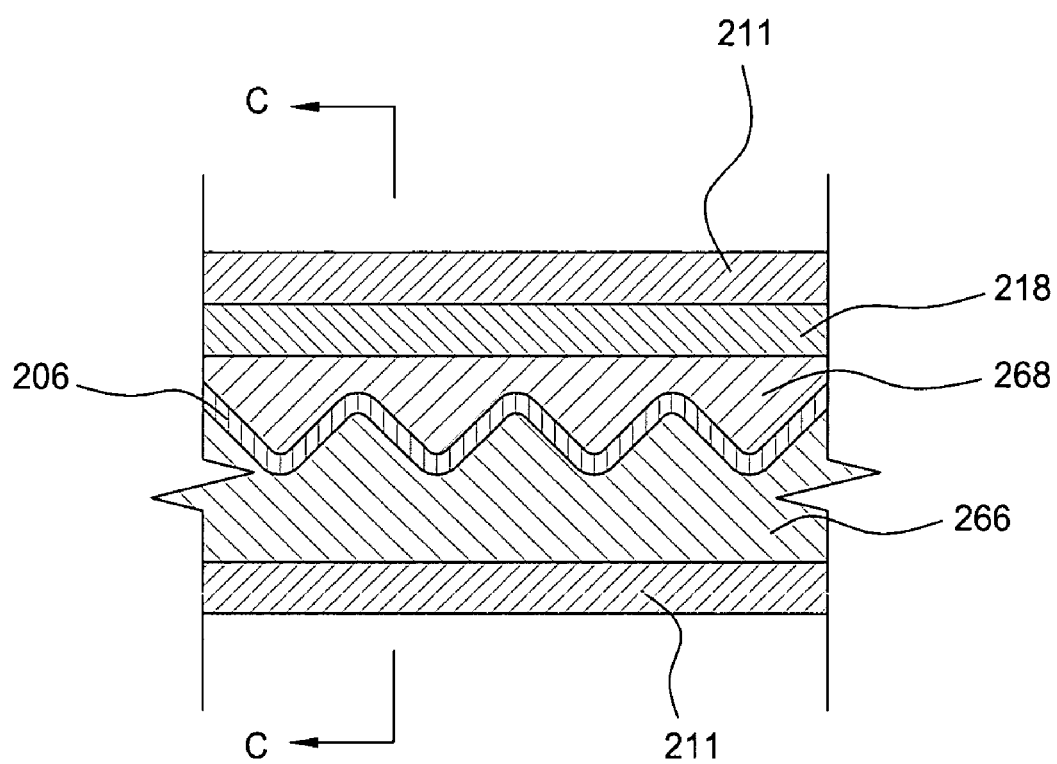
FIG. 2B is a cross-sectional view of the filter assembly taken along line B—B of FIG. 2A.
Figure 2C:
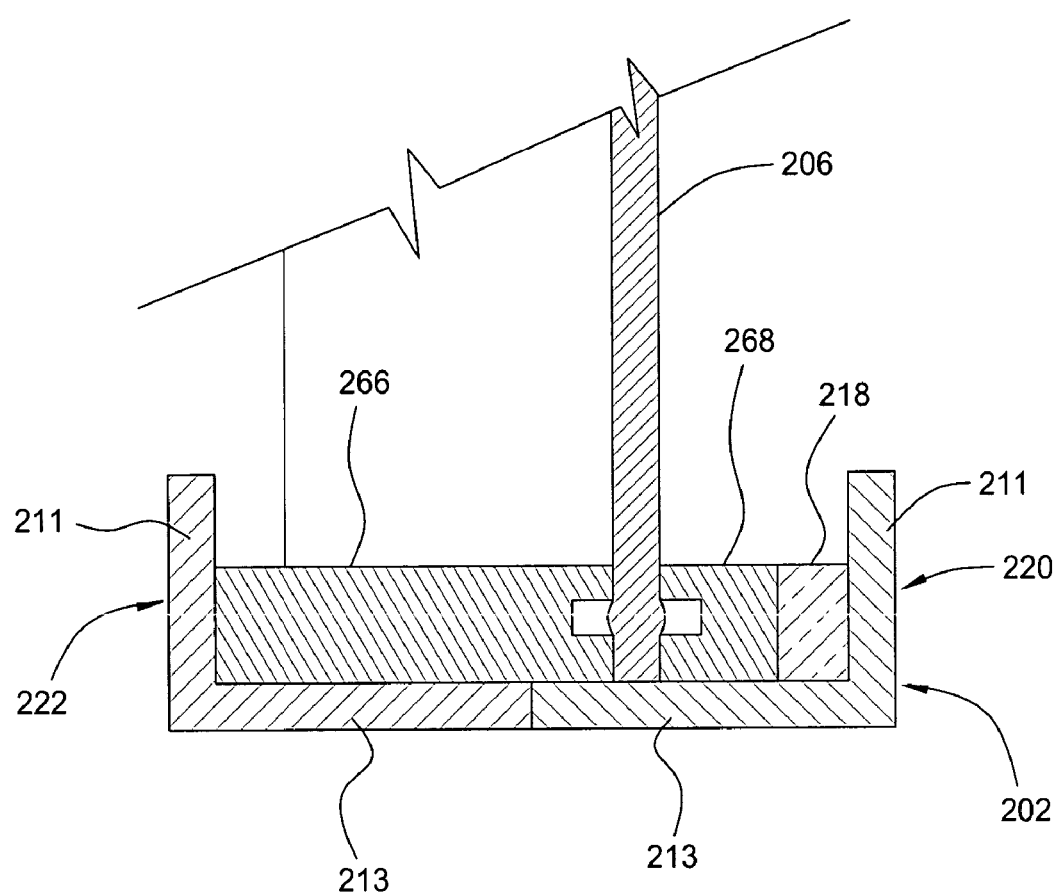
FIG. 2C is a cross-sectional view of the filter assembly taken along line C—C of FIG. 2B.

FIG. 2A is an exploded view of another filter assembly 200 having a filter media pack 206 and sealing elements 208 disposed in a frame assembly 202 according to another embodiment of the present invention. The reader is encouraged to simultaneously refer to the sectional views of FIGS. 2B–C for the best understanding of the invention. The frame assembly 202 is depicted as subassembled into an upstream portion 220 and a downstream portion 222 that are coupled to sandwich and retain the media pack 202 therebetween. Each portion 220, 222 includes one flange 211 extending inward from a split main portion 213 of each side 210, thereby comprising a substantially L-shaped section that may be jointed to form a C-shaped side cross section in the completed frame assembly 202. In the illustrated embodiment, a first open end 203 of the filter media pack 206 is compressed between first and second seal members 262, 264. A second open end 205 of the filter media 206 is compressed between third and fourth seal members 266, 268. In one embodiment, the members 266, 268 are substantially similar to those described with reference to FIGS. 1B–D.

In the embodiment depicted in FIG. 2A, a biasing element 218, comprised of a resilient material, is disposed between at least one of the seal members 262, 264 and the frame assembly 202, to urge the seal members 262, 264 against the filter media 206. The biasing element 218, and seal members 262, 264 are configured to have a width greater than a space defined between the flanges 211 of the frame assembly 202. Thus, as the resilient property of the biasing element 218 urges the seal members 262, 264 toward the opposite side 210 of the frame assembly 202, the open end 203 of the media pack 206 is sandwiched between the seal members 262, 264 while providing an air seal between the biasing element 218 and the frame assembly 202. The second opening 205 is similarly sealed using the seal members 266, 268 and a second biasing member 218.

In one method of assembly, all the downstream portions 222 of the sides 210 of the frame assembly 202 are joined to form a polygonal frame. The sides 210 may be joined by clips, tape, adhesives, screws, rivets or other suitable device. The upstream portions 222 of the frame assembly 202 are joined similar to the downstream portion 222. The first and third seal members 262, 266 are disposed in opposite sides 210 of the downstream portion 222 of the frame assembly 202. The media pack 206 is then disposed in the downstream portion 222 in an orientation that engages (i.e., interleaves with) the serrated edge 118 of the seal members 262, 266.

The second and fourth seal members 264, 268 are disposed on the open ends 203, 205 of the media pack 206 opposite the first and second seal members 262, 266. The biasing element 218 is disposed on the second and the fourth seal elements 264, 268. The subassembly that comprises the previously joined upstream portion 220 of the frame 202 is coupled to the downstream portion 222, thereby compressing the biasing elements 210 therebetween. The upstream and downstream portions 220, 222 of the frame assembly 202 may be joined by clips, tape, adhesives, screws, rivets or other suitable device. Alternatively, the biasing elements 210 may be respectively inserted between one of the seal elements 262, 264, 266, 268 and the flange 211 of the frame assembly after the upstream and downstream portions 220, 222 of the frame assembly 202 have been jointed. The other sides of the media pack 226 may be sealed in a conventional manner if desired. A biasing element 210 may be utilized with the embodiment of FIG. 1B and installed in the different sequences during and/or after the assembly of the completed frame. Additionally, use of biasing elements 210 in the filter assembly allow for stiffer materials to be utilized in the fabrication of the filter assembly.

Thus, a filter assembly having a clamped open end media pack seal is provided. The clamped seal is economical to fabricate and install. Moreover, the seal integrity is such that it is suitable for using with high efficiency air products.

Although the teachings of the present invention have been shown and described in detail herein, those skilled in the art can readily devise other varied embodiments that still incorporate the teachings and do not depart from the scope and spirit of the invention.

What is claimed is:

1. A filter assembly comprising:
   a frame assembly;
   a pleated filter media pack disposed in the frame assembly;
   a first compressible seal element disposed on a first side of an edge of the media pack and engaged with the frame assembly; and
   a second seal element disposed on a second side of the edge of the media pack and engaged with the frame assembly, the second seal element biasing the edge of the media pack against the first seal element.

2. The filter assembly of claim 1, wherein the media pack is compressively sealed to the first compressible seal element.

3. The filter assembly of claim 1 wherein the first and second seal elements compress a pleated edge of the pleated filter media pack.

4. The filter assembly of claim 1, wherein the first seal element has a serrated edge disposed against the pleated filter media pack.

5. The filter assembly of claim 1, wherein the second seal element is compressible.

6. The filter assembly of claim 1, wherein the first seal element is a plastic.

7. The filter assembly of claim 1, wherein the first seal element is a foamed plastic.

8. The filter assembly of claim 1, wherein the first seal element is an elastomer.

9. The filter assembly of claim 1, wherein the first seal element further comprises:
   an edge disposed against the pleated filter media pack; and
   at least one seal feature disposed on the edge.

10. The filter assembly of claim 9, wherein the seal feature further comprises:
    a rib extending from the edge.

11. The filter assembly of claim 9, wherein the seal feature further comprises:
    a groove formed in the edge.

12. The filter assembly of claim 1 further comprising:
    third and fourth seal elements clamping an edge of the pleated filter media pack opposite an edge clamped by the first and second seal elements.

13. The filter assembly of claim 12 further comprising:
    an adhesive sealing an edge of the media pack adjacent the edge of the media pack proximate the first seal element.

14. The filter assembly of claim 13, wherein the adhesive is selected from the group consisting of at least one of epoxy, tape, urethane, acrylic, latex and potting material.

15. The filter assembly of claim 12 further comprising:
    a high loft material disposed between an edge of the media pack adjacent the edge of the media pack proximate the first seal element and the frame assembly.

16. The filter assembly of claim 1, wherein the frame assembly biases the first and second seal elements toward one another.

17. The filter assembly of claim 1, wherein the frame assembly further comprises:
    an upstream portion; and
    a downstream portion coupled to the upstream portion thereby sandwiching the first seal element, the second seal element and the media pack therebetween.

18. The filter assembly of claim 1, wherein the first seal element is biased against the media pack in a direction parallel to an air flow direction through the media pack.

19. The filter assembly of claim 1, wherein at least one of the seal elements is biased against a side of the frame assembly.

20. The filter assembly of claim 1 further comprising:
    a grille disposed alongside the media pack.

21. A filter assembly comprising:
    a frame assembly having sides defining an opening through the frame assembly, each side having at least one inwardly extending flange;
    a pleated filter media pack disposed in the opening frame assembly and having opposing first and second open ends and opposing first and second closed ends;
    a first pair of seal elements disposed in the frame assembly and clamping the first open end of the media pack; and
    a second pair of seal elements disposed in the frame assembly and clamping the second open end of the media pack, wherein at lest one of the first pair of seal elements and at least one of the second pair of seal elements are compressible.

22. A method of fabricating a filter, comprising:
    placing a pleated filter media pack having an open edge in at least a first portion of a housing assembly; and compressing the open edge of the pleated filter media pack between a first and second seal element, wherein at least one of the first or second seal element is compressible.

23. The method of claim 22, wherein the step of compressing further comprises:
joining a second portion of the housing to the first portion of the housing, wherein the housing urges the first and second seal elements toward each other.

24. The method of claim 22 further comprising:
placing the first seal element in the housing with a serrated edge facing inward.

25. The method of claim 24, wherein the first seal element is placed in the housing before the media pack.

26. The method of claim 24, wherein the first seal element is placed in the housing after the media pack.

27. The method of claim 22, wherein the second seal element is inserted into the housing after the housing assembly is assembled around the media pack.

28. A filter assembly fabricated by the process comprising:
inserting a pleated filter media pack into a filter frame;
inserting a first seal element into the filter frame proximate a first open edge of the pleated filter media pack;
clamping the first open edge of the pleated filter media pack between the first seal element and a second compressible seal element; and
clamping a second open edge of the pleated filter media pack between a third and fourth seal element.

* * * * *